United States Patent [19]

Narayan et al.

[11] Patent Number: 5,510,053

[45] Date of Patent: Apr. 23, 1996

[54] WATER-BLOWN POLYURETHANE SEALING DEVICES AND COMPOSITIONS FOR PRODUCING SAME

[75] Inventors: Thirumurti Narayan, Grosse Ile; Steven Hicks, Trenton, both of Mich.

[73] Assignee: BASF Corporation, Mt. Olive, N.J.

[21] Appl. No.: 365,643

[22] Filed: Dec. 29, 1994

[51] Int. Cl.$^6$ .............................. C08K 3/00; C08G 18/10
[52] U.S. Cl. ................... 252/182.2; 252/182.22; 521/159; 521/160; 528/59; 528/67; 528/76; 560/26; 560/334; 560/359
[58] Field of Search ........................... 252/182.2, 182.22; 521/159, 160; 528/59, 67, 76; 560/334, 26, 359

[56] References Cited

U.S. PATENT DOCUMENTS

| | | |
|---|---|---|
| 3,591,532 | 7/1971 | Abercrombie et al. . |
| 3,607,976 | 9/1971 | Hsieh et al. . |
| 3,834,578 | 9/1974 | Smith et al. . |
| 3,862,879 | 1/1975 | Barron et al. . |
| 4,190,711 | 2/1980 | Zdrahala et al. . |
| 4,287,307 | 9/1981 | Hostettler et al. . |
| 4,312,973 | 1/1982 | Critchfield et al. . |
| 4,321,333 | 3/1982 | Alberino et al. . |
| 4,374,210 | 2/1983 | Ewen et al. . |
| 4,374,218 | 2/1983 | Tay . |
| 4,377,645 | 3/1983 | Guthrie et al. . |
| 4,497,914 | 2/1985 | Allen, Jr. et al. . |
| 4,532,316 | 7/1985 | Henn . |
| 4,559,366 | 12/1985 | Hostettler . |
| 4,561,858 | 12/1985 | Allen, Jr. et al. . |

FOREIGN PATENT DOCUMENTS

| | | |
|---|---|---|
| 0022617 | 1/1981 | European Pat. Off. . |
| 0193346 | 9/1986 | European Pat. Off. . |
| 0206548 | 12/1986 | European Pat. Off. . |
| 0398304A1 | 11/1990 | European Pat. Off. . |
| 1374745 | 6/1970 | United Kingdom . |
| 2021605 | 12/1979 | United Kingdom . |
| 2107336 | 4/1983 | United Kingdom . |
| WO92/22595 | 12/1992 | WIPO . |

*Primary Examiner*—Morton Foelak
*Attorney, Agent, or Firm*—Mary E. Golota

[57] ABSTRACT

Disclosed as a particular isocyanate prepolymer composition particularly suitable for use in polyurethane compositions having particular applicability for producing microcellular molded polyurethane articles particularly suitable for use as sealing devices. In particular, the isocyanate prepolymer composition is the result of reacting an isocyanate blend (a) having (i) 0 to 10 pbw 2,4'-diphenylmethane diisocyanate;

(ii) 40 to 90 pbw 4,4'-diphenylmethane diisocyanate;

(iii) 1 to 10 pbw 3-ring oligomers of polymethylene polyphenyl polyisocyanate;

(iv) 1 to 20 pbw of n-ring oligomers of polymethylene polyphenyl polyisocyanate (n being greater than 3); and (v) 1 to 10 pbw of a mixture of uretonimine with from 5 to 50 parts by weight of a propoxylated propylene glycol (b) having a number average molecular weight of between 2000 and 6000, and a hydroxyl number of between 10 to 75. The resulting isocyanate prepolymer (I) has a free NCO of from 20 to 30 and a viscosity of from 50 to 500 cPs.

15 Claims, No Drawings

WATER-BLOWN POLYURETHANE SEALING DEVICES AND COMPOSITIONS FOR PRODUCING SAME

BACKGROUND OF THE INVENTION

The invention provides water-blown polyurethane sealing devices and compositions for producing such devices. More particularly, the invention provides isocyanate prepolymer compositions and polyurethane compositions containing such prepolymer compositions, both compositions being especially suitable for the preparation of polyurethane sealing devices having advantageous performance properties such as improved hardness and compression characteristics.

Various aspects of the polyurethane industry have seen increasing government regulation in the area of acceptable blowing agents. This has been especially true for those involved in the production of polyurethane foams and molded microcellular polyurethane articles. In particular, due to environmental concerns relating to the earth's atmosphere and ozone levels, it is now highly desirable to replace certain physical blowing agents with alternative blowing agents.

Although research continues in the development of new blowing agents, renewed attention has been directed toward the use of water as a principal blowing agent. Desirable because of its low cost, ready availability, and minimal safety hazards, the use of water as a blowing agent nonetheless presents several problems.

Polyurethane polymers of the sort to which the instant invention is directed may generally be identified as having primary chains characterized by a segmented or block co-polymer structure. The segments are generally identified as being either "hard" or "soft" segments. Soft segments are the residual of long chain polyether or polyester polyols and are generally more flexible. Hard segments are formed from the residual of the diisocyanate and a short chain diol or chain extender.

The use of water as the principal blowing agent in the production of molded, microcellular polyurethane foams results in the incorporation of short brittle segments in the polymer matrix. These brittle segments are less forgiving to stress and detract from the overall physical properties of the resulting polymer. Properties such as flexibility, abrasion resistance, hardness, strength, and fatigue resistance appear to be particularly vulnerable. In addition, principally water blown polyurethane compositions appear to be somewhat inferior with respect to their ability to perform in a variety of processing latitudes, i.e. exhibit adequate flowability and/or demold times in molding operations.

As a result of these problems, certain segments of the polyurethane industry have found it difficult to adapt their formulations to 100% or principally water blown. The switch to water blown polyurethane formulations has been most difficult where the resulting microcellular polyurethane article must meet vigorous performance requirements.

An illustrative example is the production of sealing devices. The term "sealing device is intended to encompass devices such as gaskets, air filter seals and end caps, as well as covered gaskets for the same. Common applications for such sealing-devices include use on all types of motor driven vehicles, including, but not limited to, gas and diesel powered cars, trucks, and heavy equipment.

The operating environments of these devices often require that they function in extremes of temperature and pressure. Depending upon the end-use application, such sealing devices are often subjected to corrosive and/or structurally altering materials such as oil and gasoline. Performance properties evidencing strength, hardness, and compression characteristics have been found to be of paramount importance in the design and production of sealing devices. In particular, the characteristics measured by compression force deflection, tensile strength, and compression set have been found to be particularly vital. In general, measures taken to improve one of these properties often have detrimental effects on one or both of the other properties. An optimum balance between the three properties has been difficult to achieve in sealing devices.

As a result, it has been particularly difficult to provide water blown polyurethane compositions capable of providing molded microcellular polyurethane foams having the performance and processing properties required of commercially acceptable sealing devices.

The prior art has unsuccessfully attempted to address these problems. Several attempts have focused on the use of particular isocyanate prepolymers.

For example, U.S. Pat. No. 4,287,307 to Hostettler, discloses isocyanate-terminated prepolymers which are obtained by the reaction of (i) symmetrical aliphatic diisocyanates, cycloaliphatic diisocyanates, aromatic diisocyanates, or mixtures of such with their carbodiimide derivatives, with (ii) hydroxyl-terminated mono- or polyesters, or certain glycols or polyoxyalkylene glycols. However, the properties of the resulting foams are such that one or more plasticizers having one of four delineated structures must be used to obtain foams which are useful as shoe soles, vibration dampening devices, floatation devices, gaskets and the like. Also, example 4 of the '307 teaches that undesirable performance characteristics are obtained with water blown foams.

U.S. Pat. No. 4,321,333 to Alberino et al, discloses the use of a organic polyisocyanate (A) in the production of polyurethane polymers. Polyisocyanate (A) is disclosed as a blend of a prepolymer (a) and a liquified methylene bis(phenylisocyanate) (b). The prepolymer (a) is a reaction product of methylene bis(phenylisocyanate) with a polyol mixture comprising (1) a polyol having a molecular weight of at least 1,000, and (2) a polyol having a molecular weight of about 115 to 300. The '333 patent teaches that the additive prepolymer (a) in the isocyanate blend acts as an annealer to allow the curing of molded polyurethanes at temperatures lower than those prior art molded polyurethanes while resulting in improved green strength. However, the resultant foams do not appear to have the physical properties required of commercially acceptable sealing devices. In particular, the '333 patent fails to disclose important performance properties such as compressive force deflection and compression set.

In U.S. Pat. No. 4,374,210 to Ewen et al, the preparation of polyurethane-polyureas using aromatic diamine extenders is disclosed wherein certain prepolymers of 4,4'-methylene bis(phenylisocyanate) are used in place of 4,4'-methylene bis(phenylisocyanate) itself. The particular prepolymers are derived from the reaction of 4,4'-methylene bis(phenylisocyanate) with polyoxyethylene polyoxypropylene polyether diols and triols having molecular weights from 1,000 to 10,000, polytetramethylene glycols having molecular weights from 600 to 5,000, and polyester diols and triols having molecular weights from 500 to 8,000. However, this invention is directed toward the production of polyureaurethanes requiring the use of aromatic diamines. The resultant moldings do not have the performance properties required of sealing devices.

U.S. Pat. No. 4,559,366 to Hostettler, relates to improved integral skin microcellular polyurethane elastomers intended for use as shoe soles. The disclosed improvement relates to the use of quasi-prepolymers which are normally liquid, may have crystalline points as low as −20° C., and are derived from the reaction of (1) a mixture of normally solid diphenylmethane diisocyanate, carbodiimide and/or uretoneimine and (2) poly(oxyethyleneoxypropylene) polyols. However, the disclosures of the '366 patent are particularly directed toward the production of integral skin microcellular polyether polyurethane elastomer products having specific gravities in the range of about 0.4 to 0.7 gm/cm$^3$. In addition, the patent expressly teaches that the elimination of water as a secondary blowing agent is preferred, and that blowing is most preferably effected with halocarbons.

Finally, published PCT application WO 92/22595 by the Dow Chemical Company, discloses a process for preparing polyurethane elastomer from a soft-segment isocyanate-terminated prepolymer. The prepolymer is obtained by reacting a molar excess of polyisocyanate having at least 70 weight percent 4,4'-methylene diphenylisocyanate, with an isocyanate-reactive composition containing (a) a branched diol or triol having a molecular weight of from 60 to 300, and (b) a polyoxyalkylene polyol or mixtures thereof having an average functionality of from 2 to 4 and a molecular weight of from 3000 to 12000, wherein the parts by weight ratio of (a):(b) is from 0.01:1 to 0.25:1. However, the requirement of the particular branched diols or triols adds to the cost of the composition. The resultant elastomers fail to provide the performance properties required of sealing devices due to the brittleness incorporated by the short chain diols in the polymer backbone.

Thus, it would be highly desirable to provide a principally water blown polyurethane composition capable of providing molded microcellular polyurethane articles having advantageous performance properties such as improved hardness, strength, and compression which are especially suited for use as sealing devices.

Accordingly, it is an object of this invention to provide principally water blown polyurethane compositions which are particularly suitable for the preparation of molded microcellular polyurethane articles having advantageous performance properties such as improved hardness, strength, and compression characteristics.

More particularly, it is an object of this invention to provide principally water blown polyurethane compositions which are particularly suited for the preparation of molded microcellular polyurethane sealing devices exhibiting particularly desirable values for compression force deflection, tensile strength, and compression set.

It is a further object of this invention to provide isocyanate prepolymer compositions particularly suitable for use in polyurethane compositions which are solely or principally water blown and which are used in the production of molded microcellular polyurethane articles.

It is an additional object of the invention to provide isocyanate prepolymer compositions intended for use in principally water blown polyurethane compositions used in the production of microcellular molded polyurethane articles exhibiting desirable values for compression force deflection, tensile strength, and compression set.

Finally, it is an object of this invention to provide molded polyurethane articles and a process for making such, wherein the resulting molded polyurethane articles have improved hardness, strength, and compression characteristics, such as desirable compression set, tensile strength and compression force deflection values.

SUMMARY OF THE INVENTION

The foregoing objects, as well as others, are achieved by the following aspects of the invention.

The invention provides an isocyanate prepolymer composition which is the result of reacting an isocyanate blend (a) having (i) 0 to 10 parts by weight 2,4'-diphenylmethane diisocyanate, (ii) 40 to 90 parts by weight 4,4'-diphenylmethane diisocyanate, (iii) 1 to 10 parts by weight 3-ring oligomers of polymethylene polyphenyl polyisocyanate, (iv) 1 to 20 parts by weight of n-ring oligomers of polymethylene polyphenyl polyisocyanate (n being greater than 3), and (v) 1 to 10 parts by weight of a mixture of uretonimine containing molecules and carbodiimide containing molecules, with (b) from 5 to 50 parts by weight of a propoxylated propylene glycol having a number average molecular weight of between 2,000 and 6,000 and a hydroxyl number of between 10 to 50, wherein all weights are based on the total weight of (a) and (b). The resulting isocyanate prepolymer has a percent free NCO of from 20 to 30 and a viscosity of from 50 to 500 cPs.

The invention further provides a polyurethane composition suitable for the preparation of molded polyurethane articles, the composition requiring a isocyanate prepolymer composition (I) having a percent free NCO of from 20 to 30 and a viscosity of from 50 to 500 cPs, the composition being the result of reacting an isocyanate blend (a) having: (i) 0 to 10 parts by weight 2,4'-diphenylmethane diisocyanate, (ii) 40 to 90 parts by weight 4,4'-diphenylmethane diisocyanate, (iii) 1 to 10 parts by weight 3-ring oligomers of polymethylene polyphenyl polyisocyanate, (iv) 1 to 20 parts by weight of n-ring oligomers of polymethylene polyphenyl polyisocyanates (n being greater than 3), and (v) 1 to 10 parts by weight of a mixture of uretonimine containing molecules and carbodiimide containing molecules; with (b) from 5 to 50 parts by weight of a propoxylated propylene glycol having a number average molecular weight of between 2,000 and 6,000 and a hydroxyl number of between 10 to 50. The polyurethane composition further comprises an isocyanate-reactive component (II), a chain extender (III), and a blowing agent which is principally water.

Finally, the invention provides a process of molding polyurethane articles, as well as the articles produced therefrom. The process requires providing a polyurethane composition having an isocyanate prepolymer composition (I) having a percent free NCO of from 20 to 30 and a viscosity of from 50 to 500 cPs, the isocyanate prepolymer composition comprising a result of reacting an isocyanate blend (a) having: (i) 0 to 10 parts by weight 2,4'-diphenylmethane diisocyanate, (ii) 40 to 90 parts by weight 4,4'-diphenylmethane diisocyanate, (iii) 1 to 10 parts by weight 3-ring oligomers of polymethane polyphenyl polyisocyanate, (iv) 1 to 20 parts by weight of n-ring oligomers of polymethylene polyphenyl polyisocyanate (n being greater than 3), (v) 1 to 10 parts by weight of a mixture uretonimine containing molecules and carbodiimide containing molecules and from 5 to 50 parts by weight of a propoxylated propylene glycol (b) having a number average molecular weight of between 2,000 and 6,000 and a hydroxyl number of between 10 to 50. The polyurethane composition utilized in the process of molding further contains an isocyanate-reactive component (II), a chain extender (III), and a blowing agent (IV), comprised of water. The described polyurethane composition is placed inside a mold for a period of time sufficient to produce a molded polyurethane article. The claimed molded polyurethane articles have desirable hardness, strength, and compression properties.

DETAILED DESCRIPTION OF THE PREFERRED EMBODIMENT

While not wishing to be bound to a particular theory, it is believed that the ability of the invention to provide solely or principally water blown polyurethane compositions capable of providing molded microcellular polyurethane articles which evidence desirable hardness and fatigue properties, results from the use of the particular isocyanate prepolymer composition (I) of the invention.

The isocyanate prepolymer compositions (I) of the invention consist essentially of the reaction product obtained by the reaction of an isocyanate blend (a) and a particular propoxylated propylene glycol (b).

Isocyanate blend (a) is a particular mixture of isocyanate-containing species. While not wishing to be bound to a particular theory, the ranges set forth below are believed to be necessary to obtain the desirable performance properties described herein.

The isocyanate blend (a) has been found to be useful in achieving the objectives set forth above, when the blend contains particular amounts of certain diisocyanate monomers, polymeric polyisocyanate, and uretonimine containing molecules and carbodiimide containing molecules. In particular, it has found that isocyanate blend (a) should contain (i) 2,4'-diphenylmethane diisocyanate, (ii) 4,4'-diphenylmethane diisocyanate, (iii) 3-ring oligomers of polymethylene polyphenyl polyisocyanate, (iv) n-ring oligomers of polymethylene polyphenyl polyisocyanate wherein n is greater than 3, and (v) uretonimine-carbodiimide derivatives of diphenylmethane diisocyanate.

The (i) 2,4'-diphenylmethane diisocyanate and (ii) 4,4'-diphenylmethane diisocyanate species may be provided by commonly available diphenylmethane diisocyanates (MDI). Suitable MDI's may be either pure, i.e. solely 4,4'-MDI, or mixtures containing both 4,4'-MDI and 2,4'-MDI isomers. If mixtures of MDI isomers are utilized, it is preferred that they contain less than 2 percent by weight of 2,4'-MDI isomers.

The 3-ring (iii) and n-ring (n being greater than 3) (iv) oligomers of polymethylene polyphenyl polyisocyanate (PMDI) will generally be obtained from a mixture of diphenylmethane diisocyanate isomers, 'triisocyanates' and 'higher functional oligomers'. As used wherein, the latter two terms are intended to describe 3-ring MDI oligomers and n-ring MDI oligomers, wherein n is greater than 3. Suitable PMDI isocyanates will generally contain a certain percentage of diphenylmethane diisocyanate isomers with the remainder being the desired 3-ring and higher functional oligomers.

In addition to the above molecular species, isocyanate blend (a) will further contain uretonimine-carbodiimide derivatives of essentially pure diphenylmethane diisocyanate. Such mixtures of uretonimine-containing molecules and carbodiimide-containing molecules can be made by well-known techniques, such as the conversion of a portion of the isocyanate groups in diphenylmethane diisocyanate to a carbodiimide by using phosphorus-containing catalysts at elevated temperatures, and then allowing the i5 carbodiimide modified diphenylmethane diisocyanates to further react with unreacted isocyanates groups to form uretonimine modified MDI. Those skilled in the art will appreciate that the conversion from carbodiimide modified MDI to uretonimine modified MDI does not typically go to completion, resulting in the composition containing both carbodiimide-containing molecules and uretonimine-containing molecules. Typically, from about 10 to 35 percent by weight of the MDI is converted to uretoniminecarbodiimide modified MDI species, leaving generally from 65 to 90 percent of the MDI unreacted.

As indicated from the foregoing discussion, it can be seen that isocyanate blend (a) can generally be comprised of a mixture of various commercially available isocyanates. However, it has been found that in order to obtain the desired end-use advantageous performance properties, the prepolymers of the instant invention require that the above molecular species be present in particular amounts as based on the total amount of isocyanate blend (a) and a particular propoxylated propylene glycol (b).

It has been found that isocyanate blend (a) should have from 0 to 10 parts by weight 2,4'-MDI, 40 to 90 parts by weight 4,4'-MDI, 1 to 10 parts by weight 3-ring oligomers of PMDI, 1–20 parts 10 by weight n-ring oligomers of PMDI, and 1–10 parts by weight of a mixture of uretonimine-containing molecules and carbodiimide-containing molecules.

More particularly, it has been found that based on the weight of both (a) and (b), isocyanate blend (a) should have from 0 to 5 parts by weight 2,4-MDI, 50 to 80 parts by weight 4,4'-MDI, 1–8 parts by weight 3-ring oligomers of PMDI, 2–15 parts by weight n-ring oligomers of PMDI wherein n is greater than 3 and 1 to 7 parts by weight of a mixture of carbodiimide containing molecules and uretonimine containing molecules.

Finally, it is most preferred that isocyanate blend (a) have 0 to 3 parts by weight 2,4-MDI, 55 to 75 parts by weight 4,4-MDI, 2–6 parts by weight 3-ring oligomers of PMDI, 5–10 parts by weight of n-ring oligomers of PMDI wherein n is greater than 3, and from 2 to 6 parts by weight of a mixture of carbodiimide containing molecules and uretonimine containing molecules.

It will be appreciated by those skilled in the art that the amounts of commercially available isocyanates to be used in making isocyanate blend (a), will depend upon the respective percentages of the particular isocyanate species contained therein. The working examples set forth below indicate the particular amounts of illustrative commercially available isocyanates to be used in obtaining isocyanate blend (a).

Isocyanate blend (a) will be blended with a particular propoxylated propylene glycol (b) (also described herein as 'polyol (b)').

Suitable propoxylated propylene glycol (b) will generally have a number average molecular weight of between 2000 to 6000. A preferred polyol (b) will have a number average molecular weight of from 2000 to 4000 while the most preferred polyol (b) will have a number average molecular weight of between 2500 to 3500.

In addition, the polyol (b) may be characterized by its hydroxyl number. Suitable polyols will have a hydroxyl number of between 10 to 75. Preferred polyols (b) will have a hydroxyl number of between 15 to 50 while the most preferred propoxylated propylene glycol (b) will have a hydroxyl number of between 20 to 30.

Finally, the propoxylated propylene glycol (b) will be reacted with isocyanate blend (a) in an amount of between 5 to 50 parts by weight based on the total amount of isocyanate blend (a) and propoxylated propylene glycol (b). More preferably, propoxylated propylene glycol (b) will be present in an amount of between 5 to 40 parts by weight while most preferably, isocyanate blend (a)-will be reacted with polyol (b) in an amount of between 10 to 30 parts by weight based on the total amounts (a) and (b).

The method of making the isocyanate prepolymer composition (I) requires that isocyanate blend (a) be reacted with polyol (b) to form a prepolymer composition. In general, the liquid ingredients of isocyanate blend (a) will be preferably charged to a reactor which is heated to a temperature sufficient to make any solid MDI based components molten or liquid. Subsequently, a sufficient amount of the propoxylated propylene glycol polyol (b) be added to the heated reactor. The reactor contents will be subsequently heated to a temperature of between 25° C. and 100° C. More preferably, the reaction between isocyanate blend (a) and polyol (b) will take place at temperatures between 50° C. to 80° C.

The reaction between reactants (a) and (b) will preferably take place for a time sufficient for the final isocyanate prepolymer composition (I) to have a free NCO content of about 20 to 30. In general, the reaction of polyol (b) with isocyanate blend (a) will take a maximum of ten hours and preferably less than a total of seven hours. Most preferred is a reaction time of five hours or less.

At the conclusion of the reaction process, the isocyanate prepolymer composition (I) of the invention should have a free NCO content of from about 20 to 30 percent by weight. More preferably, the claimed isocyanate prepolymer composition will have a free NCO content of from 22 to 28 percent while the most preferred isocyanate composition will have a percent NCO of from 24 to 26 percent.

The viscosity of the resulting isocyanate prepolymer composition will generally be from 50 to 500 cPs at 25° C. A preferred range will be from 50 to 300 cPs while the most preferred viscosities will be from 75 to 200 cPs (all at 25° C.).

In general, the prepolymer composition (I) will be added to a resin side component comprised of an isocyanate-reactive component (II), a chain-extender (III), a blowing agent (IV), and optionally one or more additives (V) selected from the group consisting of surfactants, catalysts, stabilizers, dyes, fillers, pigments, flame inhibitors, and anti-oxidants, and mixtures thereof.

The isocyanate-reactive component (II) (also termed 'polyol (II)') may be selected from compounds having at least two isocyanate reactive hydrogens which are commonly employed in the preparation of polyurethane foams and elastomers. Such compounds are often prepared by the catalytic condensation of alkylene oxide or a mixture of alkylene oxides either simultaneously or sequentially with an organic compound having at least two active hydrogen atoms, such as evidenced by U.S. Pat. Nos. 1,922,459; 3,190,927; and 3,346,557.

Representative isocyanate-reactive components, i.e. polyols, include polyhydroxyl-containing polyesters, polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain amino groups and a hydroxyl group. Also, alkylene oxide adducts of compounds which contain one SH group and one OH group as well as those which contain an amino groups and an SH group may be used.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butane diol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohols" are compounds derived from phenol such as 2,2-bis(4-hydroxylphenyl)propane, commonly known as Bisphenol A.

Any suitable polyoxyalkylene polyether polyol may be used such as the polymerization product of an alkylene oxide or a mixture of alkylene oxides with a polyhydric alcohol as an initiator. Examples of alkylene oxides include ethylene oxide, propylene oxide, butylene oxide, amylene oxide, mixtures thereof, tetrahydrofuran, alkylene oxide-tetrahydrofuran mixtures, epihalohydrins, and aralkylene oxides such as styrene oxide. Suitable initiators include both aliphatic and aromatics alcohols, such as ethylene glycol, propylene glycol, dipropylene glycol, trimethylene glycol, 1,2-butanediol, 1,3-butanediol, 1,4-buanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol, and 2,2-bis(4-hydroxyphenyl)propane.

The polyoxyalkylene polyether polyols may have either secondary hydroxyl groups or a mixture of primary and secondary hydroxyl groups. If the latter, the mixture should have a majority of secondary hydroxyl groups. Included among the polyether polyols are polyoxyethylene glycol, polyoxypropylene glycol, polyoxypropylene glycerine, polyoxybutylene glycol, polytetramethylene glycol, block copolymers, for example, combinations of polyoxypropylene and polyoxyethylene glycols, poly- 1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859, *Encyclopedia of Chemical Technology*, Vol. 7, pp. 257–262, published by Interscience Publishers, Inc. (1951) or in U.S. Pat. No. 1,922,459.

Polyethers which are preferred as the isocyanate-reactive component (II) include the alkylene oxide addition products of trimethyolpropane, glycerine, propylene glycol, dipropylene glycol, and 2,2'-(4,4'-hydroxyphenyl)propane and mixtures of diols and triols such as propylene glycol-glycerine blends. The most preferred diols and triols are propylene glycol, glycerine, and mixtures thereof.

Alkylene oxides which are preferred are ethylene oxide and propylene oxide or mixtures thereof, which are reacted with the above initiators to make polyoxyalkylene polyether polyols having predominately polyoxypropylene groups with from 0 to 30 percent by weight polyoxyethylene groups as an end cap, a block, or heteric, preferably as a cap.

The polyether polyols of the invention have a number average molecular weight ranging from 500 to 10,000, preferably from 2000 to 6,000, with average functionalities from 1.5 to about 4.0, preferably from 1.8 to 3.0. Hydroxyl numbers will generally range from about 11 to 225. The most preferred polyols will have a number average molecular weight of from 2000 to 4000.

Particularly suitable polyols are the propylene oxide and ethylene oxide adducts of propylene glycol, glycerine and/or mixtures thereof, with characteristics as described above. Most preferably, however, such polyols will have a number average molecular weight of 3000 to 6000, a functionality of 1.8 to 3.0 and a hydroxyl number of 25 to 85.

Polyols containing graft polymer dispersions may also be employed in the invention as isocyanate-reactive component (II).

Graft polyols are well-known in the art and prepared by the in situ polymerization of one or more vinyl monomers, preferably acrylonitrile and styrene, in the presence of a polyether or polyester polyol, especially polyols containing a minor amount of natural or induced unsaturation. Methods of preparing such graft polyols may be found in columns 1–5 and in the examples of U.S. Pat. No. 3,652,639; in columns 1–6 in the examples of U.S. Pat. No. 3,823,201; particularly in columns 2–8 in the examples of U.S. Pat. Nos. 4,690,956; and 4,524,157, all of which patents are herein incorporated by reference.

In addition to isocyanate prepolymers (I) and isocyanatereactive component (II), the polyurethane compositions of the invention will likewise comprise chain-extending agents (III). Chain-extending agents (III) which may be employed include those compounds having at least two functional groups bearing active hydrogen atoms such as hydrazine, primary and secondary diamines, amino alcohols, amino acids, hydroxy acids, glycols, or mixtures thereof. Such agents will generally have a number average molecular weight of less than about 400. A preferred group of chain-extending agents includes, water, ethylene glycol, 1,4-buanediol, diethylene glycol, and primary and secondary diamines which react more readily with the prepolymer than does water such as phenylene diamine, 1,4-cyclohexane-bis-(methylamine), diethyl toluene diamine, ethylenediamine, diethylenetriamine, N-(2-hydroxypropyl)ethylenediamine, N,N'-di(2-hydroxypropyl)ethylenediamine, piperazine, and 2-methylpiperazine. 1,4 -buane diol, ethylene glycol, diethylene glycol and mixtures thereof are the most preferred chain extending agents (III).

Those skilled in the art will appreciate that some of the compounds discussed above as suitable chain extenders (III) will also be capable of serving, sometimes simultaneously, as catalysts, i.e. as an additive (V).

In addition to the isocyanate prepolymer (I), the isocyanate reactive component (II), and the chain extender (III), the polyurethane composition of the invention will also contain a blowing agent (IV) which may be comprised solely or principally of water. While it is most preferred that the blowing agent (IV) be comprised solely of water, it is within the scope of the invention that the blowing agent (III) be comprised only principally or primarily of water. As used herein, the term "principally" shall be defined to mean a blowing agent wherein water contributes to at least half of the overall blow of the foam. Those skilled in the art will appreciate that the actual amount or percentage of water used as part of the overall blowing agent (IV) will depend upon the composition of any co-blowing agent(s). The amount of water in a 'principally' water blown formulation will be at least 20 percent of the total blowing agent, while the most preferred amount of water in a 'principally' water blown formula will be 100% as based on the total weight of blowing agent.

In the event that the blowing agent is comprised only principally of water, the blowing agent (IV) may further be comprised of chemically inert low boiling hydrocarbons or halogenated hydrocarbons. Examples of suitable halogenated hydrocarbons are those having boiling points below 50° C., preferably between −50° C. and 30° C. at atmospheric pressure. Illustrative examples include halogenated hydrocarbons such as monochlorodifluoromethane, dichloromonofluoromethane, dichlorofluoromethane, and mixtures thereof as well as hydrocarbons such a propane, n-butane, and isobutane as well as dimethylether, n-pentane, and cyclopentane.

In general, the blowing agent (IV) can consist of between 0.04 to 100 percent by weight, preferably 80 to 100 percent by weight of water and from 0 to 80 percent by weight, preferably 0 to 20 percent by weight halogenated hydrocarbons and/or hydrocarbons, with the respective percents by weight being based on the total weight of the blowing agent (IV).

In general, depending upon its composition, the blowing agent (IV) will be present in a amount of from 0.2 to 10.0 percent by weight based on the weight of the isocyanate-reactive component (II). More preferably, the polyurethane composition of the invention will contain from 0.2 to 1.0 percent by weight blowing agent and most preferably from 0.2 to 0.5 percent by weight blowing agent based on the weight of the isocyanate-reactive component In addition to the above, the polyurethane composition may optionally contain one or more additives (V) selected from the group consisting of surface active agents, catalysts, stabilizers, dyes, fillers, pigments, flame inhibitors, antioxidants, plasticizers, and the like, as well as mixtures thereof.

Any suitable catalyst may be used, including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surfactant or surface-active agent may be necessary for the production of high grade polyurethane foam and articles. Numerous surface-active agents have been found satisfactory. Nonionic surface-active agents are preferred. Of these, the nonionic surface-active agents such as the well-known silicones have been found particularly desirable. Other surface-active agents which are operative, include paraffin oils, castor oil, turkey red oil, polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris(2,3-dibromopropyl)phosphate, tris(β-chloroethyl)phosphate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane, melamine, antimony pentoxide, and dibromoethyl-dibromocyclohexane antimony trioxide. The concentrations of flame retardant compounds which may be employed range from 5 to 25 parts per 100 parts of the total resin side.

Preferred pigments and/or dyes include carbon black and dispersions of the same in resin and/or solvent.

The isocyanate prepolymer (I) and the resin side, i.e. components (II), (III), (IV) and optional (V), may be mixed at temperatures from 15° C. to 90° C., preferably at tank temperatures from 20° C. to 35° C., and may be poured or sprayed into an open mold which is subsequently optionally closed, or may be injected at high pressures into a closed mold. The mixing can be performed mechanically by means of a stirrer or under high pressure by the impingement method. The mold temperature should be from about 20°C. to 60°C., preferably 30° C. to 60°C. The resultant microcellular polyurethane moldings are primarily intended for use in the sealing device market but other possible applications include use as head rests, spoilers, bumpers and seating applications in the automotive field as well as nonautomotive uses such as shoe soles.

As indicated at the above, performance properties indicating strength, hardness and compression characteristics are particularly important in the characterization of sealing devices. It has been found that in order for the sealing devices to perform optimally, they must possess particular values for the physical parameters indicative of strength, hardness and compression characteristics.

In particular, it has been found that molded polyurethane articles intended for use as sealing devices should possess compression force deflection values of between 5 to 10 psi at 25 percent deflection when tested per ASTM D3574 Test C.

In addition, it has been found that even after said foam has been aged for seven days at 158° F. with an allowance of at least 16 but not more than 96 hours to recover, there should be no more than a plus or minus 20 percent change from the original deflection values. Such testing is generally done per ASTM D3574 Test K.

With respect to compression set values it has been found that with respect to compression set at 158° F. there should be no more than a 15 percent maximum set average at a 50 percent deflection after the material has been aged 22 hours at 158° F. with a 30 minute recovery. See ASTM D3574 Test D. Similarly, for compression set measured at 180° F., there should be no more than a 30 percent set average at a 50 percent deflection after aging 22 hours at 180° F. with a 30 minute recovery. See ASTM D3574 Test D with temperature change only.

In general, the molded polyurethane sealing devices must have a uniform skin and be free of surface irregularities and tears on the mold surface side. It should be relatively free of surface pinholes and voids. In addition, the polyurethane material must be capable of adhering to metal and/or plastic substrates.

Finally, the polyurethane composition must possess a reactivity profile consistent with generally accepted processing requirements.

The following working examples describe the manner and process of making and using the invention and set forth the best mode contemplated by the inventors of carrying out the invention, but are not to be construed as limiting.

The following ingredients were employed to make the isocyanate prepolymer (I) the polyurethane composition of the invention, and the molded microcellular polyurethane articles prepared therewith:

Polyol A is a propylene oxide adduct of propylene glycol having an OH number of 29.

Polyol B is a propylene oxide-ethylene oxide adduct of glycerine having approximately 16 weight percent ethylene oxide and an OH number of 35.

Polyol C is a propylene oxide-ethylene oxide adduct of trimethyolpropane having 13 percent ethylene oxide and a hydroxyl number of 35.

Polyol D is a graft polyol having 30 weight percent 1:1 acrylonitrile styrene and an OH number of 24, wherein the carrier is a propylene oxide-ethylene oxide adduct of trimethyolpropane having 13 weight percent ethylene oxide cap as carrier.

Isocyanate A is a polymeric MDI having about 47 weight percent 2-ring isomers of MDI, about 20 weight percent 3-ring isomers of MDI and about 33 weight percent of n-ring isomers of MDI, wherein n is greater than 3, and an NCO content of 31 to 32.0 weight percent.

Isocyanate B is a modified MDI containing about 75 weight percent MDI, the remainder being a temperature controlled equilibrium of uretonimine-containing molecules and carbodiimide containing-molecules.

Isocyanate C is essentially pure 98% 4,4'-MDI and 2% 2,4'-MDI.

XFE-1028 is a proprietary blend of 67 percent 1,4,BDO, 33 percent tertiary amine which is commercially available from Air Products and Chemicals, Inc.

DABCO BL-17 is a delayed action catalyst for water/isocyanate reaction in polyurethane foam, commercially available from Air Products and Chemicals Inc.

FOAMREZ UL-29 a polyurethane catalyst believed to be dioctyltin diisooctylmercaptoacetate. It is commercially available from Witco Corporation.

Lial 125 is a polyurethane reactive plasticizer, believed to be an oxoalcohol and commercially available from Texaco.

DABCO HB is a proprietary blend of tertiary amines and butane diol useful as a polyurethane catalyst and commercially available from Air Products and Chemicals Inc.

XFE 1027 is a blend of tertiary amines and EG and is commercially available from Air Products and Chemicals, Inc.

FOAMREZ UL-32 is a polyurethane catalyst believed to be dioctyltin dimercaptide and is commercially available from Witco Corporation.

DABCO X-8154 is a 67 percent DPG 33 percent delayed action amine similar to TEDA type of polyurethane catalyst and is commercially available from Air Products and Chemicals, Inc.

Additive A is a silicon surfactant and is commercially available from Air Products and Chemicals, Inc.

Additive B is a dispersion of carbon black pigment in P-1062, and is commercially available from Penn Color as PPK-839.

Additive C is a dispersion of carbon black in Dow Chemical Company Polyol, and is commercially available from Penn Color as EX-678B.

T-12 is dibutyltin dilaurate which is commercially available from Air Products and Chemicals, Inc.

All parts are in parts by weight unless otherwise indicated.

EXAMPLE 1

Isocyanate blend (a) was prepared by charging 100 pounds of isocyanate A and 86.5 pounds of isocyanate B to a reactor which had been preheated to a temperature of 50°. The contents of the reactor were agitated and the reactor temperature adjusted to 50° C. 218 pounds of molten isocyanate C were added to the reactor content. To the resultant isocyanate blend (a) was added 95.5 pounds of polyol A over the course of about 60 minutes. Subsequently, the reactor contents were heated to 60° C. and reacted 60° C. for two hours. The reactor contents were subsequently cooled to 35°C. and discharged through a 25-micron filter into a 55 gallon drum container. The net product weighed 500 pounds.

The free NCO-content of the resultant isocyanate prepolymer (I) composition was 25.5 weight percent. The isocyanate prepolymer composition (I) had a viscosity of 126 cPs at 25°C.

The following examples illustrate polyurethane compositions and molded polyurethane articles, produced using the isocyanate prepolymer composition of Example 1.

EXAMPLE 2

A polyurethane composition intended for use in the production of molded, microcellular polyurethane articles was prepared as follows.

A resin side component (#2) was prepared using the following components:

| Resin Side #2 | |
| --- | --- |
| Polyol B | 94.07 |
| 1,4 Butane diol | 2.25 |
| XFE-1028 | 1.00 |
| Additive B | 2.00 |
| BL-17 | 0.20 |
| UL-29 | 0.06 |
| Water | 0.42 |

Resin side (#2) was combined with the isocyanate prepolymer of Example 1 at a 1.03 index, i.e., 100 parts of resin (#2) to 29.64 parts of isocyanate prepolymer (I).

The reactivity and free rise density of a hand mixed foam made from the resulting polyurethane composition were as follows:

| Cream Time (sec) | 18 |
| --- | --- |
| Gel Time (sec) | 36 |
| Rise Time (sec) | 76 |
| Tack Free (sec) | 165 |
| Free Rise Density (pcf) | 16 |

The polyurethane composition was placed in a low pressure molding machine. The resin side of the composition was at a temperature of between 75° to 85° F., while the isocyanate prepolymer was at a temperature of between 75° to 85° F. The mold temperature was between 75° to 120° F. After approximately 4–6 minutes the resulting molded foam part was removed from the mold.

The resultant gasket exhibited a molded density of between 17 to 20 pcf and particularly desirable performance properties as indicated below. (17–20 pcf)

| Physical Properties | Gasket #2 |
| --- | --- |
| Compression Deflection (at 25% deflection) | 6.2 psi |
| Heat Aging Compression Deflection (% change from the original (above) deflection value) | −4.5% |
| Compression Set @ 158° F. (at 50% deflection >22 hrs. @ 158° F.; 30 min. recovery) | 1.3% |
| Compression Set @ 180° F. (at 50% deflection >22 hrs. @ 180° F.; 30 min. recovery) | 11.3% |
| Oil Resistance (% Volume Change >22 hrs. in oil @ 158° F.) | 17.1% |
| Tensile Strength | 21.3 psi |
| Elongation | 75.0% |

The above numbers illustrate that the values for compression deflection, heat aging compression deflection, and compression set at both 158° F. and at 180° F. are particularly desirable while tensile strength is adequate.

EXAMPLE 3

A most preferred resin side component (#3) was prepared using the following:

| Resin Side (#3) | |
| --- | --- |
| Polyol B | 85.29 |
| 1,4 butane diol | 8.00 |
| XFE1028 | 1.00 |
| Additive B | 4.00 |
| BL-17 | 0.20 |
| UL-29 | 0.01 |
| Water | 0.50 |
| Lial-125 | 1.00 |

Resin side (#3) was combined with the isocyanate prepolymer of Example 1 at a 1.03 index, i.e., 100 parts of resin side #3 to 53.09 parts of isocyanate prepolymer (I).

The reactivity and free rise density of a hand mixed foam made from the resulting polyurethane composition were as follows:

| Cream Time | 18 |
| --- | --- |
| Gel Time (sec) | 37 |
| Rise Time (sec) | 66 |
| Tack Free (sec) | 92 |
| Free Rise Density (pcf) | 13.3 |

A gasket was produced using the molding parameters discussed in Example 2.

The resultant gasket exhibited desirable performance properties as indicated below:

| Physical Properties | Gasket #3 |
| --- | --- |
| Compression Deflection (25% deflection) | 9.5 psi |
| Compression Set @ 158° F. (at 50% deflection >22 hrs. @ 158° F.; 30 min. recovery) | 9.6% |
| Compression Set @ 180° F. (at 50% deflection >22 hrs. @ 180° F.; 30 min. recovery) | 23.8% |
| Oil Resistance (% Volume Change >22 hrs. in oil @ 158° F.) | 6.7% |
| Tensile Strength | 60.8 psi |
| Elongation | 120% |

As illustrated above, it can be seen that the values for compression deflection and compression set are either particularly desirable or acceptable.

EXAMPLE 4

A resin side component (#4) was prepared using the following:

| Resin Side #4 | |
|---|---|
| Polyol B | 88.33 |
| 1,4 butane diol | 8.75 |
| XFE1028 | 0.50 |
| Additive B | 2.00 |
| BL-17 | 0.20 |
| UL-29 | 0.020 |
| Water | 0.20 |
| Lial-125 | 1.00 |

The reactivity and free rise density of a hand mixed foam made from the polyurethane composition resulting from the combination of Resin Side #4 and the prepolymer of Example 1 were as indicated below:

Resin side (#4) was combined with the isocyanate prepolymer of Example 1 at a 103 index, i.e., 100 parts of resin (#4) to 47.99 parts of isocyanate prepolymer (i).

| Cream Time | 18 + 3 Sec. |
|---|---|
| Gel Time | 44 + 4 Sec. |
| Rise Time | 75 + 7 Sec. |
| Tack Free | 82 + 15 Sec. |
| Free Rise Density | 28. + 1 lbs/ft$^3$ |

A gasket was produced using the molding parameters of Example 2. The resulting gasket exhibited a balance of properties as indicated below:

| PHYSICAL DATA: | |
|---|---|
| Compression Deflection (25% deflection) | 41.0 psi |
| Compression Set @ 158° F. | 2.4% |
| Compression Set @ 180° F. | 7.5% |
| Oil Resistance (% Vol. Change) | 8.5% |
| Tensile Strength | 160. psi |
| Elongation | 110.% |

EXAMPLE 5

A resin side component was prepared utilizing:

| Resin Side #5 | |
|---|---|
| Polyol B | 88.09 |
| Ethylene Glycol | 5.00 |
| Diethylene Glycol | 1.00 |
| EX-6788 | 3.00 |
| Lial-125 | 1.00 |
| XFE1027 | 0.50 |
| BL-17 | 0.30 |
| UL-29 | 0.01 |
| X2-5384 | 0.50 |
| WATER | 0.60 |

The reactivity of the foam was measured using a hand mixed foam. A 1.03 index was used with the isocyanate prepolymer of Example 1.

The reactivity was as follows:

| Cream Time (sec) | 18 |
|---|---|
| Gel Time (sec) | 48 |
| Rise Time (sec) | 64 |
| Tack free (sec) | 97 |
| Free Rise Density (pcf) | 11.6 |
| Demold Time | 4–6 Minutes |
| TOC | 44/40–48 |

The resultant polyurethane composition was used to produce a molded polyurethane gasket via the molding parameters of Example 2.

The performance properties of the resulting gasket were as follows:

| Physical Properties | GASKET #5 |
|---|---|
| Compression Deflection (at 25% deflection) | 9.2 |
| Compression Set @ 158° F. (at 50% deflection >22 hrs. @ 158° F.; 30 min. recovery) | 10.6 |
| Compression Set @ 180° F. (at 50% deflection >22 hrs. @ 180° F.; 30 min. recovery) | 12.3 |
| Oil Resistance (% Volume Change >22 hrs. in oil @ 158° F.) | 6.71 |
| Tensile Strength | 82 psi |
| Elongation | 110% |

EXAMPLE 6

A resin side component was prepared utilizing:

| Resin Side #6 | |
|---|---|
| Polyol C | 61.37 |
| Additive B | 3.00 |
| Polyol D | 25.00 |
| Ethylene Glycol | 6.00 |
| UL-32 | 0.03 |
| BL-17 | 0.30 |
| X-25384 | 0.80 |
| X-8154 | 0.60 |
| Lial 125 | 2.50 |
| WATER (DI) | 0.40 |

Resin side (#6) was mixed with the isocyanate prepolymer (I) of Example 1 at a 1.00 index, i.e., 100 parts of resin side (#6) were mixed with 51 parts of isocyanate prepolymer (I). The reactivity of the resultant polyurethane composition was measured using a hand mixed free rise foam. The reactivity profile was as follows:

| Cream Time (sec) | 18 |
|---|---|
| Gel Time (sec) | 44 |
| Rise Time (sec) | 75 |
| Tack free (sec) | 82 |
| Free Rise Density (pcf) | 28 |

The physical properties of a gasket end cap (#6) molded per Example 2 were as follows:

| Physical Properties | Application #6 |
|---|---|
| Compression Load Deflection (@ 25% deflection) | 19.1 psi |
| Compression Load Deflection (@ 50% deflection) | 44.2 psi |
| Tensile Strength | 438 psi |

-continued

| Physical Properties | Application #6 |
|---|---|
| Elongation | 201% |
| Density | 24 pcf |
| Shore A Hardness | 55 |
| Split Tear | 24.9 pi |
| Die "C" Tear | 69.2 pi |

It should be understood that while the invention, as shown and described herein, constitutes a preferred embodiment of the invention, it is not intended to illustrate all possible forms thereof. A variety of compositions or articles can be created by one of ordinary skill in the art without departing from the spirit and scope of the invention disclosed and claimed.

We claim:

1. An isocyanate prepolymer composition suitable for preparing a molded polyurethane article, the composition consisting essentially of the result of reacting:
   (a) an isocyanate blend comprising:
      (i) 0 to 10 pbw 2,4'-diphenylmethane diisocyanate;
      (ii) 40 to 90 pbw 4,4'-diphenylmethane diisocyanate;
      (iii) 1 to 10 pbw 3-ring oligomers of polymethylene polyphenyl polyisocyanate;
      (iv) 1 to 20 pbw of n-ring oligomers of polymethylene polyphenyl polyisocyanate (n being greater than 3); and
      (v) 1 to 10 pbw of a mixture of uretonimine containing molecules and carbodiimide containing molecules; and
   (b) from 5 to 50 pbw of a propoxylated propylene glycol 15 having a number average molecular weight of between 2000 and 6000 and a hydroxyl number of between 10 to 75;
   wherein the resulting prepolymer has a % free NCO of from 20 to 30 and a viscosity of from 50 to 500 cPs and all pbw are based on the total weight of (a) and (b).

2. The isocyanate prepolymer composition of claim 1 wherein the isocyanate blend (a) comprises:
   (i) 0 to 5 pbw 2,4'-diphenylmethane diisocyanate;
   (ii) 50 to 80 pbw 4,4'-diphenylmethane diisocyanate;
   (iii) 1 to 8 pbw 3-ring oligomers of polymethylene polyphenyl polyisocyanate;
   (iv) 2 to 15 pbw of n-ring oligomers of polymethylene polyphenyl polyisocyanate (n being greater than 3); and
   (v) 1 to 7 pbw of a mixture of uretonimine containing molecules and carbodiimide containing molecules.

3. The isocyanate prepolymer composition of claim 2 wherein the isocyanate blend (a) comprises:
   (i) 0 to 3 pbw 2,4'-diphenylmethane diisocyanate;
   (ii) 55 to 75 pbw 4,4'-diphenylmethane diisocyanate;
   (iii) 2 to 6 pbw 3-ring oligomers of polymethylene polyphenyl polyisocyanate;
   (iv) 5 to 10 pbw of n-ring oligomers of polymethylene polyphenyl polyisocyanate (n being greater than 3); and
   (v) 2 to 6 pbw of a mixture of uretonimine containing molecules and carbodiimide containing molecules.

4. The isocyanate prepolymer composition of claim 1 wherein the composition consists essentially of the result of reacting isocyanate blend (a) with from 5 to 40 pbw of the propoxylated propylene glycol.

5. The isocyanate prepolymer composition of claim 4 wherein the composition consists essentially of the result of reacting isocyanate blend (a) with from 10 to 30 pbw of the propoxylated propylene glycol.

6. The isocyanate prepolymer composition of claim 1 wherein the composition consists essentially of the result of reacting isocyanate blend (a) with the propoxylated propylene glycol having a number average molecular weight of between 2000 and 4000.

7. The isocyanate prepolymer composition of claim 6 wherein the composition consists essentially of the result of reacting isocyanate blend (a) with the propoxylated propylene glycol having a number average molecular weight of between 2500 and 3500.

8. The isocyanate prepolymer composition of claim 1 wherein the composition consists essentially of the result of reacting isocyanate blend (a) with the propoxylated propylene glycol having a hydroxyl number of between 15 to 50.

9. The isocyanate prepolymer composition of claim 8 wherein the composition consists essentially of the result of reacting isocyanate blend (a) with the propoxylated propylene glycol having a hydroxyl number of between 20 to 40.

10. The isocyanate prepolymer composition of claim 1, the composition comprising the result of reacting:
    (a) an isocyanate blend comprising:
       (i) 0 to 5 pbw 2,4'-diphenylmethane diisocyanate;
       (ii) 50 to 80 pbw 4,4'-diphenylmethane diisocyanate;
       (iii) 1 to 8 pbw 3-ring oligomers of polymethylene polyphenyl polyisocyanate;
       (iv) 2 to 15 pbw of n-ring oligomers of polymethylene polyphenyl polyisocyanate (n being greater than 3); and
       (v) 1 to 7 pbw of a mixture of uretonimine containing molecules and carbodiimide containing molecules, wherein the weights of (i) to (v) are based on the weight of blend (a); and
    (b) from 5 to 40 pbw of a propoxylated propylene glycol having a number average molecular weight of between 2000 and 4000 and a hydroxyl number of between 15 to 50.

11. The isocyanate prepolymer composition of claim 10, the composition comprising the result-of reacting:
    (a) an isocyanate blend comprising:
       (i) 0 to 3 pbw 2,4'-diphenylmethane diisocyanate;
       (ii) 55 to 75 pbw 4,4'-diphenylmethane diisocyanate;
       (iii) 2 to 6 pbw 3-ring oligomers of polymethylene polyphenyl polyisocyanate;
       (iv) 5 to 10 pbw of n-ring oligomers of polymethylene polyphenyl polyisocyanate (n being greater than 3); and
       (v) 2 to 6 pbw of a mixture of uretonimine containing molecules and carbodiimide containing molecules, wherein the weights of (i) to (v) are based on the weight of blend (a); and
    (b) from 10 to 30 pbw of a propoxylated propylene glycol having a number average molecular weight of between 2500 and 3500 and a hydroxyl number of between 20 to 40.

12. The isocyanate prepolymer of claim 1 having a % free NCO of from 22 to 28.

13. The isocyanate prepolymer of claim 12 having a % free NCO of from 24 to 26.

14. The isocyanate prepolymer of claim 1 having a viscosity of from 50 to 300 cPs at 25 degrees C.

15. The isocyanate prepolymer of claim 14 having a viscosity of from 75 to 200 cPs at 25 degrees C.

* * * * *